(12) United States Patent
Duggal et al.

(10) Patent No.: US 9,965,601 B2
(45) Date of Patent: May 8, 2018

(54) EDITING WATERMARKED ASSETS (71) Applicant: Adobe Systems Incorporated, San Jose, CA (US)

(72) Inventors: Ashish Duggal, Delhi (IN); Sachin Soni, Delhi (IN); Anmol Dhawan, Ghaziabad (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 157 days.

(21) Appl. No.: 15/084,261

(22) Filed: Mar. 29, 2016

(65) Prior Publication Data

US 2017/0286646 A1 Oct. 5, 2017

(51) Int. Cl.
*G06F 7/04* (2006.01)
*G06F 17/30* (2006.01)
*H04N 7/16* (2011.01)
*G06F 21/16* (2013.01)
*H04N 1/40* (2006.01)
*H04N 21/83* (2011.01)
*G06F 21/10* (2013.01)
*H04N 21/8358* (2011.01)
*H04N 1/32* (2006.01)

(52) U.S. Cl.
CPC .......... *G06F 21/16* (2013.01); *G06F 17/3028* (2013.01); *G06F 21/10* (2013.01); *G06F 2221/074* (2013.01); *G06F 2221/0724* (2013.01); *H04N 1/32144* (2013.01); *H04N 1/32251* (2013.01); *H04N 1/32267* (2013.01); *H04N 1/40068* (2013.01); *H04N 21/83* (2013.01); *H04N 21/8358* (2013.01)

(58) Field of Classification Search
CPC .... G06F 7/04; G06F 17/30; G06F 2221/0724; G06F 21/10; G06F 21/16; G06F 17/3028; H04N 7/16; H04N 1/32144; H04N 1/32251; H04N 1/32267; H04N 1/40068; H04N 21/83; H04N 21/8358
See application file for complete search history.

(56) References Cited

U.S. PATENT DOCUMENTS

| 5,568,570 | A | * | 10/1996 | Rabbani | ................ G06T 1/0028 |
| | | | | | 348/394.1 |
| 2003/0021444 | A1 | * | 1/2003 | Echizen | ................ G06T 1/0064 |
| | | | | | 382/100 |
| 2003/0123698 | A1 | * | 7/2003 | Murakami | ............ G06T 1/0064 |
| | | | | | 382/100 |
| 2003/0223099 | A1 | * | 12/2003 | Fan | ....................... G06T 1/0071 |
| | | | | | 358/537 |
| 2005/0140788 | A1 | * | 6/2005 | Fox | .................... H04N 1/32101 |
| | | | | | 348/207.1 |

(Continued)

*Primary Examiner* — Jayesh Jhaveri
(74) *Attorney, Agent, or Firm* — Wolfe-SBMC (57) ABSTRACT

A digital medium environment includes an asset processing application that performs editing of a watermarked asset. An improved asset editing method implemented by the asset processing application comprises receiving a watermarked asset, receiving edits to the watermarked asset, storing metadata corresponding to the edits together with an asset identification (ID), communicating the metadata and asset ID, applying edits using the metadata to an unwatermarked version of the asset retrieved using the asset ID, adding a watermark back to the edited asset, and providing the edited, watermarked asset.

20 Claims, 7 Drawing Sheets

(56) References Cited

U.S. PATENT DOCUMENTS

| | | | |
|---|---|---|---|
| 2006/0050880 A1* | 3/2006 | Taylor | H04N 7/167 380/203 |
| 2007/0283250 A1* | 12/2007 | Tsukamoto | H04N 1/32133 715/234 |
| 2008/0199040 A1* | 8/2008 | Jonsson | H04N 1/32149 382/100 |
| 2008/0298632 A1* | 12/2008 | Reed | G06T 1/0064 382/100 |
| 2013/0117571 A1* | 5/2013 | Petrovic | H04L 9/00 713/176 |
| 2016/0212441 A1* | 7/2016 | Adsumilli | H04N 19/63 |

* cited by examiner

EDITING WATERMARKED ASSETS

BACKGROUND

Designers often use stock images to incorporate into their own work products. For example, a designer may obtain a stock image from an on-line image store and wish to place the stock image in an advertisement or other work product the designer is preparing. Often, the designer makes edits to the stock image using image editing software to tailor the stock image for a particular job. For example, the designer may remove features in the stock image and fill the resulting empty space with another part of the stock image, such as from the background of the image. Because the stock images usually contain a watermark, such as overlaid text on the stock image, edits made by the designer may distort or otherwise adversely affect the watermark. Therefore, the designer may be forced to share images containing distorted watermarks, making the designer's work look poor and unpolished, as well as reflecting poorly for branding of the watermark. Furthermore, upon purchasing, licensing, or purchasing and licensing the watermarked image, the designer is often forced to re-apply the edits to the purchased, licensed, or purchased and licensed image. Further, if the edits were applied to a lower resolution image, which is often the case, a designer's editing work will necessarily be duplicated when the designer purchases a corresponding higher resolution image. Needless to say, this is not a desirable situation and is quite inefficient for designers.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In one or more implementations, in a digital medium environment including an asset processing application that performs editing of a watermarked asset, an improved editing method implemented by the asset processing application, the method comprising: receiving a first copy of a watermarked asset at a first resolution; receiving edits to the first copy of the watermarked asset; storing metadata corresponding to the received edits; communicating the metadata and an asset ID corresponding to the watermarked asset to a third party; and receiving, from the third party, a second copy of the watermarked asset at a second resolution, the edits having been applied, using the metadata, to the second copy of the watermarked asset with the watermark removed and subsequently added back to the second copy of the watermarked asset after the edits were applied.

In one or more implementations, in a digital medium environment including an asset processing application that performs processing of a watermarked asset, an improved processing method implemented by the asset processing application, the method comprising: receiving, from an asset editing application, metadata comprising edit information associated with a first watermarked asset and an asset ID corresponding to the first watermarked asset; retrieving an asset corresponding to the asset ID; applying edits corresponding to the edit information to the retrieved asset; adding to the asset to which the edits were applied a watermark corresponding to the watermarked asset to provide a second watermarked asset; and communicating the second watermarked asset to the asset editing application.

In one or more implementations, a system implemented in a digital medium environment including a computing device having an asset processing application to perform processing of a watermarked asset, the system comprising: a processing system; and at least one computer-readable medium storing instructions executable via the processing system to implement an asset processing application configured to perform operations comprising: receiving, from an asset editing application, metadata comprising edit information associated with a first watermarked asset and an asset ID corresponding to the first watermarked asset; retrieving an asset corresponding to the asset ID; applying edits corresponding to the edit information to the retrieved asset; adding to the asset to which the edits were applied a watermark corresponding to the watermarked asset to provide a second watermarked asset; and communicating the second watermarked asset to the asset editing application.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

In the description below, editing techniques are described in the context of editing a watermarked asset, such as a watermarked image. It is to be appreciated and understood, however, that the editing techniques can be utilized with various assets other than images, such as video content, without departing from the spirit and scope of the claimed subject matter.

Introduced here are techniques that address the drawbacks of editing watermarked assets, such as those described above. The techniques utilize a novel workflow in which edits made to a watermarked asset, including those edits that have the potential to distort a watermark, are stored as metadata, together with an asset identification (ID) corresponding to the watermarked asset. The asset ID is used to retrieve a version of the asset that does not contain a watermark. The metadata is used to apply the edits to the retrieved version of the asset. An undistorted watermark is then added back to the edited asset, thus updating the watermarked asset according to the edits to provide an edited, watermarked asset with an undistorted watermark.

The novel workflow described herein allows a user to make edits to a watermarked asset, and update the watermark and the watermarked asset so that the updated watermarked asset does not contain a distorted watermark.

The novel workflow described herein also allows a user to make edits to a watermarked asset, update the watermark and the watermarked asset, and select the updated watermarked asset, such as for purchase, license, or purchase and license, without having to re-apply the edits to the purchased, licensed, or purchased and licensed asset.

In one or more implementations, the novel workflow described herein operates in a client-server environment in which metadata and an asset ID are communicated from a client to a server, which retrieves an asset according to the asset ID, applies edits using an asset processing application, and adds an undistorted watermark to the edited asset to be supplied back to the client. Alternatively, the novel workflow described herein can operate on a client device.

In one or more implementations, metadata is communicated automatically to update a watermark and watermarked asset, such as in response to receiving edits to the watermarked asset. In other implementations, metadata is communicated to update a watermark and a watermarked asset responsive to receiving user input to update the watermark, such as a user selecting an option designated to update the watermark.

In one or more implementations, edits are made to a watermarked asset at a first resolution and stored as metadata. The metadata is used to apply the edits to a retrieved version of the asset, and then an undistorted watermark is added back to the edited asset to provide an updated, watermarked asset at a second resolution. In one or more implementations, the first resolution is lower than the second resolution, allowing the designer to make edits on a lower quality asset, thus saving resources, while receiving an updated, watermarked asset at a higher quality, such as for presentation or consumption. Hence, the designer may make edits to a lower quality asset with a device that has relatively low resources, such as a mobile phone, and receive a higher quality updated, watermarked asset with a device that has powerful resources, such as a desktop computer or editing workstation.

In the following discussion, an example digital medium environment is first described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

Figure 1:
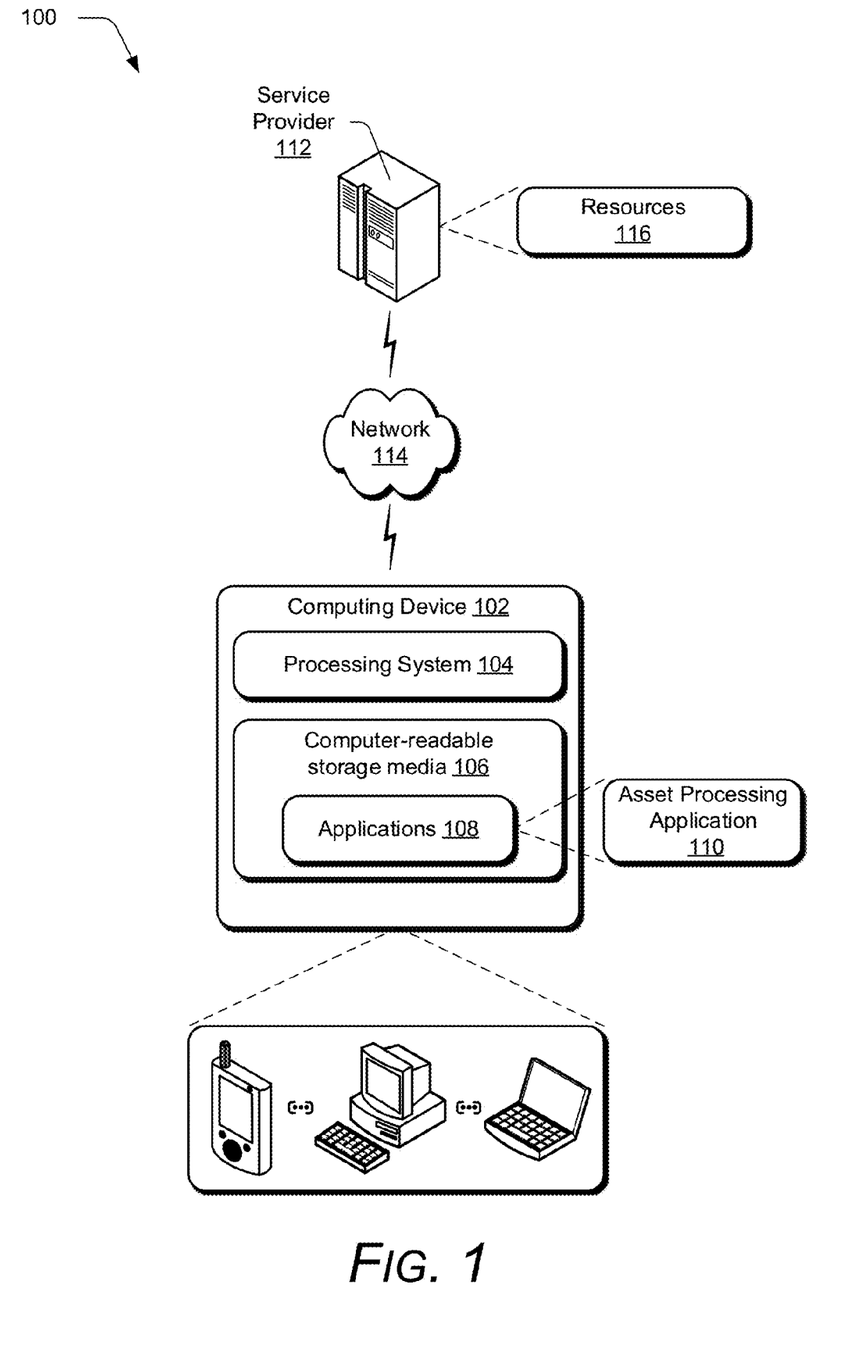
FIG. 1 is an illustration of a digital medium environment in an example implementation that is operable to employ techniques described herein.

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 including a processing system 104 that may include one or more processing devices, one or more computer-readable storage media 106, and various applications 108 embodied on the computer-readable storage media 106 and operable via the processing system 104 to implement corresponding functionality described herein. In at least some embodiments, applications 108 may include an asset processing application 110. The asset processing application 110 is configured to apply an edit to a watermarked asset while preserving a watermark of the watermarked asset from being distorted by the applied edit, as described below in more detail.

Applications 108 may also include a web browser which is operable to access various kinds of web-based resources (e.g., assets, content and services). The applications 108 may also represent a client-side component having integrated functionality operable to access web-based resources (e.g., a network-enabled application), browse the Internet, interact with online providers, and so forth. Applications 108 may also include an interface operable to access assets from various resources, including asset stores. Applications 108 may further include an operating system for the computing device and other device applications.

The computing device 102 may be configured as any suitable type of computing device. For example, the computing device may be configured as a desktop computer, a laptop computer, a mobile device (e.g., assuming a handheld configuration such as a tablet or mobile phone), a tablet, a camera, a gaming station, and so forth. Thus, the computing device 102 may range from full resource devices with substantial memory and processor resources (e.g., personal computers, game consoles) to a low-resource device with limited memory or processing resources (e.g., mobile devices). Additionally, although a single computing device 102 is shown, the computing device 102 may be representative of a plurality of different devices to perform operations "over the cloud" as further described in relation to FIG. 7.

The digital medium environment 100 further depicts one or more service providers 112, configured to communicate with computing device 102 over a network 114, such as the Internet, to provide a "cloud-based" computing environment. Network 114 may comprise a variety of networks, including the Internet, an intranet, local area network (LAN), wide area network (WAN), personal area network (PAN), body area network (BAN), cellular networks, terrestrial networks, satellite networks, combinations of networks, and the like, and as such may be wired, wireless, or a combination thereof. Generally, a service provider 112 is configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Resources 116 may be licensed or may be made freely available, (e.g., without authentication, license, or account-based access). The resources 116 can include any suitable combination of services and content typically made available over a network by one or more providers. Some examples of services include, but are not limited to, an asset editing service (such as one that employs an asset processing application such as asset processing application 110), a web development and management service, a collaboration service, a social networking service, a messaging service, an advertisement service, and so forth. Content may include various combinations of assets, including videos, ads, audio, multi-media streams, animations, images, web documents, web pages, applications, device applications, text documents, and the like.

Resources 116 may also include an asset store operable to provide watermarked assets to asset processing application 110. Asset processing applications may include asset editing capabilities, and therefore may comprise asset editing applications.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Though illustrated in FIG. 1 separately from computing device 102, computing device 102 may comprise network 114 and service provider 112, so that in some implementations, the operations described herein can be performed on computing device 102. In other implementations, service provider 112 represents a third party to computing device 102 and performs at least some of the operations described herein.

Having considered an example digital medium environment, consider now a discussion of an example of a distorted watermark created from editing a watermarked asset.

Figure 2:
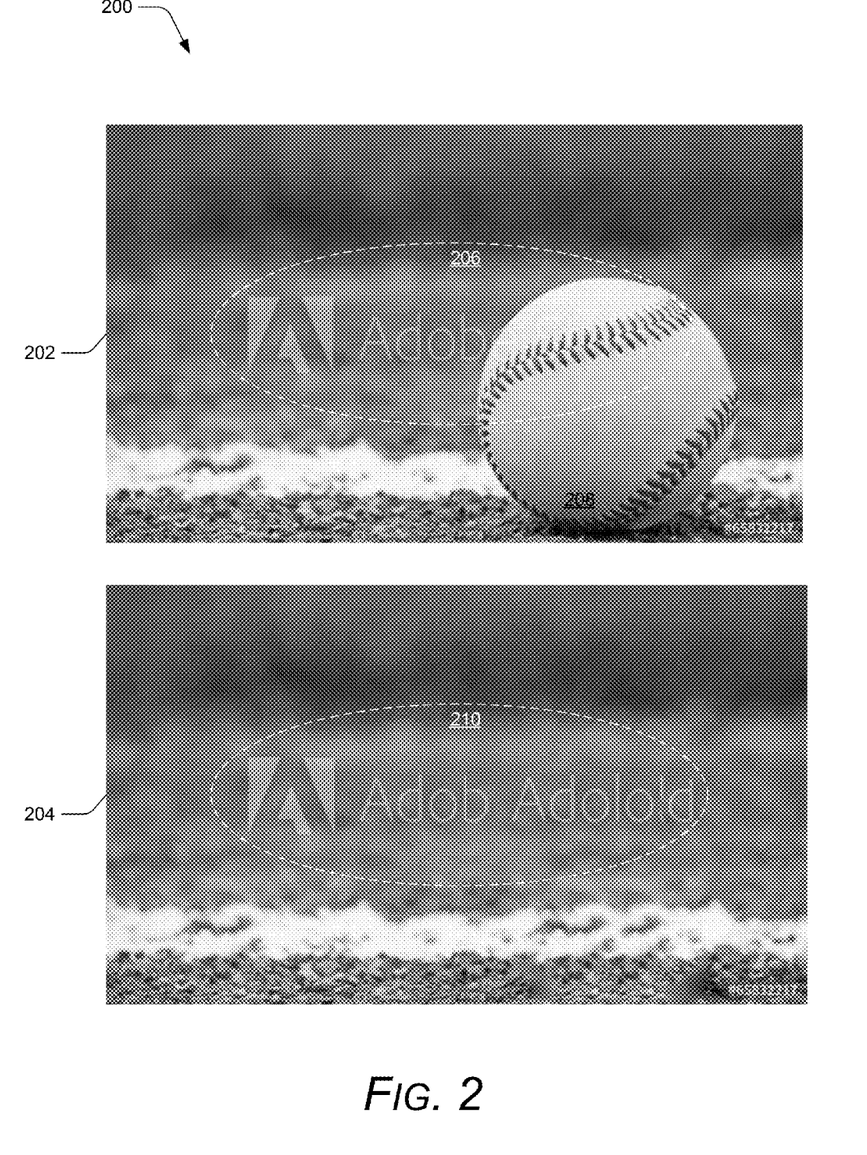
FIG. 2 illustrates an example of a distorted watermark created from editing a watermarked asset.

FIG. 2 illustrates two images, generally at 200. A first image 202 is a watermarked image and contains watermark 206, encompassed by a dashed ellipse. Watermark 206 comprises a symbol and the text "Adobe". Generally, a watermark may comprise a variety of components including text, numbers, images, animations, videos, symbols, emoticons, masks, overlays, designators, redactions, and the like.

Image 202 may be a stock image available for purchase, license, or purchase and license to a designer who wishes to incorporate image 202, or an edited version of image 202, into the designer's work product. For example, the designer may obtain image 202 from an on-line image store or other third party and wish to place at least parts of image 202 in an advertisement, poster, web page, document, and the like.

Image 202 also contains ball 208. Suppose now the designer desires to use image 202 without ball 208. Accordingly, the designer edits image 202 to create image 204 using an image editing tool. For example, asset processing application 110 includes an image editing component (shown in FIG. 3) to edit image 202 and produce image 204. Notice that in image 204, ball 208 is removed, and in its place part of the background of image 204 is placed. Such operations may be performed by selection and content-fill tools, for example. As a result of the editing applied, image 204 now includes watermark 210, encompassed by a dashed ellipse. Notice that the watermark is now a distorted version of watermark 206. Specifically, watermark 210 contains extra characters that make the watermark unreadable and somewhat sloppy. In addition, the distorted watermark makes the designer's work look poor and unpolished, as well as reflecting poorly on the branding of the watermark. Furthermore, the designer may be forced to re-apply the edits upon purchasing, licensing, or purchasing and licensing the image, thus leading to a very inefficient editing experience.

Having considered an example of a distorted watermark created from editing a watermarked asset, consider now a discussion of some example details of an asset processing application in accordance with one or more implementations.

Example Asset Processing Application

Figure 3:
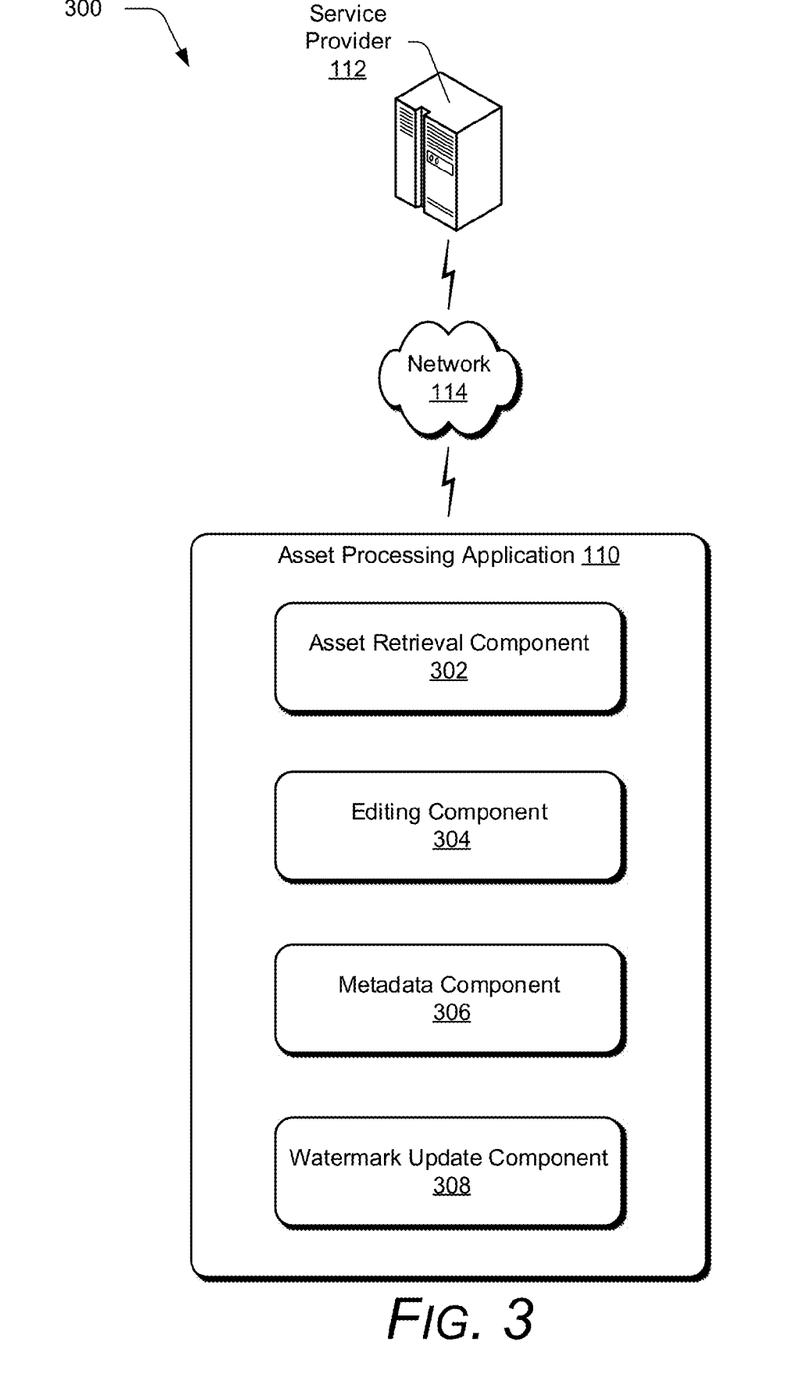
FIG. 3 illustrates a digital medium environment including an example asset processing application comprising an asset retrieval component, an editing component, a metadata component, and a watermark update component in accordance one or more implementations.

FIG. 3 illustrates a digital medium environment 300 that includes an example asset processing application 110. In this implementation, the asset processing application 110 includes asset retrieval component 302, editing component 304, metadata component 306, and watermark update component 308.

Asset retrieval component 302 is representative of functionality that implements retrieval and storage of assets. An asset comprises a format and resolution-independent description of content, such as videos, ads, audio, multimedia streams, animations, images, web documents, web pages, applications, device applications, text documents, combinations of assets, and the like, from which an asset in a particular format and at a particular resolution can be generated. For example, an asset may comprise a description of an image that can be used to generate an image in Joint Photographic Experts Group (JPEG) format at a prescribed pixel resolution.

Asset retrieval component 302 is configured to retrieve a watermarked asset from service provider 112, such as from an asset store comprising resources 116, and store the asset on computing device 102. The retrieved asset may be in a particular format and at a particular resolution, such as to allow easy editing of the asset on a mobile device. Accordingly, asset retrieval component 302 may retrieve an asset at a first resolution when edits are to be applied, and at a second resolution when the retrieved asset is to be purchased or licensed. By allowing the first resolution to be lower than the second resolution, a designer may perform edits on a low-resolution asset without consuming valuable bandwidth and resources.

Editing component 304 is representative of functionality that implements asset editing capabilities. Editing capabilities may include any suitable editing capabilities, such as image editing, video editing, text editing, animation editing, drafting and drawing capabilities, and the like. For example, editing component 304 includes image editing capabilities to edit image 202 to produce image 204 in FIG. 2. Editing component 304 may provide any suitable interface to enable asset editing, such as a Graphical User Interface (GUI). Editing component 304 communicates edits received for and made to the retrieved watermarked asset as edit information to metadata component 306. For example, if a user using editing component 304 performs edits A, B, and C, in that order, then edit A, followed by edit B, followed by edit C are communicated to metadata component 306. Edits may be communicated individually as the edit occurs or in groups or batches. The edits can be communicated in any suitable format.

Metadata component 306 is representative of functionality that implements metadata management capabilities. Metadata component 306 stores edit information provided from editing component 304 as metadata. In addition, metadata component 306 stores an asset identification (ID) corresponding to the retrieved watermarked asset for which the edit information applies.

Metadata component 306 is also configured to provide metadata and an asset ID to service provider 112 over network 114. Since service provider 112 comprises resources 116 that include an asset processing application, like asset processing application 110, service provider 112 can use the metadata and asset ID to provide an updated asset to asset retrieval component 302 over network 114. The updated asset is generated by applying edits corresponding to edit information in the metadata to an original version of the asset identified using the asset ID, such as a version of the asset without a watermark. The original version of the asset without a watermark and the watermark may be maintained in an asset store comprising resources 116, such as asset store 720 in FIG. 7. Alternatively, the original version of the asset without a watermark may be generated by removing a watermark from a version of the asset.

Once edits corresponding to the edit information in the metadata are applied to an original version of the asset without a watermark, a watermark is added back to the updated asset at service provider 112 using any existing technique. Hence, the edits corresponding to the edit information in the metadata are not applied to the watermark that is added, and therefore the watermark is not distorted in the updated asset. Rather, the updated asset contains a clean, undistorted watermark.

The updated asset may be provided at a different resolution or in a different format than the originally retrieved watermarked asset to which the edits were first applied. For example, the updated asset may be provided at a higher or lower resolution than the first retrieved watermarked asset. Furthermore, by allowing a designer to apply edits to the watermarked asset and update the asset to contain a clean, undistorted watermark, the designer will receive a clean, updated version of the edited asset before deciding on purchasing, licensing, purchasing and licensing, or using the watermarked asset. Hence, the original retrieved watermarked asset may be an unlicensed or unpurchased asset, while the updated asset may be licensed or purchased. Upon purchase, license, or purchase and license, the updated asset may be provided to the user with the watermark removed, but with the edits applied so that the user need not re-apply the edits.

Watermark update component 308 is representative of functionality that implements watermark updating capabilities. Watermark update component 308 causes metadata component 306 to provide metadata and an asset ID to service provider 112, and correspondingly, asset retrieval component 302 to receive an updated asset with an undistorted watermark from service provider 112.

In some implementations, watermark update component 308 is configured to cause a user option to be presented, such as in a graphical user interface (GUI). The user option provides the user with an opportunity to manually cause edit information to be transmitted to the service provider 112. Responsive to receiving user input to update a watermark, such as by selecting the presented option, metadata component 306 communicates metadata and an asset ID to service provider 112, and asset retrieval component 302 receives an updated asset with an undistorted watermark from service provider 112. The user option may be in the form of an "update watermark" button, checkbox, tab, or the like, that when selected by a user causes metadata component 306 to communicate metadata and an asset ID to service provider 112, and asset retrieval component 302 to receive an updated asset with an undistorted watermark from service provider 112.

In other implementations, watermark update component 308 is configured to cause metadata component 306 to automatically communicate metadata and an asset ID to service provider 112. In some implementations, watermark update component 308 is configured to cause asset retrieval component 302 to automatically receive an updated asset with an undistorted watermark from service provider 112. Automatic communication can occur in any suitable way such as, by way of example and not limitation, responsive to editing component 304 receiving an edit, a predetermined number of edits, or a type of edit. For example, watermark update component 308 may determine that a certain type of edit has occurred, such as a content-aware fill or healing brush edit. The watermark update component may then automatically trigger a watermark update by causing metadata component 306 to automatically communicate metadata and an asset ID to service provider 112. Retrieval component 302 may then automatically receive an updated asset with an undistorted watermark from service provider 112. Alternatively, watermark update component 308 may automatically trigger a watermark update based on determining that a certain portion of the watermark has been edited, such as a company logo. Other factors can trigger an update such as when the watermark is determined to be too distorted, such as beyond a threshold amount of error in the edited watermark compared to an original undistorted watermark, or based on a percentage of the watermark being distorted. For example, watermark update component 308 may automatically trigger a watermark update because more than a threshold percentage of the watermark, such as 20% of the watermark, has been distorted by edits received at editing component 304. Alternatively, watermark update component 308 may automatically trigger a watermark update every N edits received at editing component 304, for some integer N.

Having considered a digital medium environment that includes an example asset processing application, consider now example methods in accordance with one or more embodiments.

Example Methods

Figure 4:
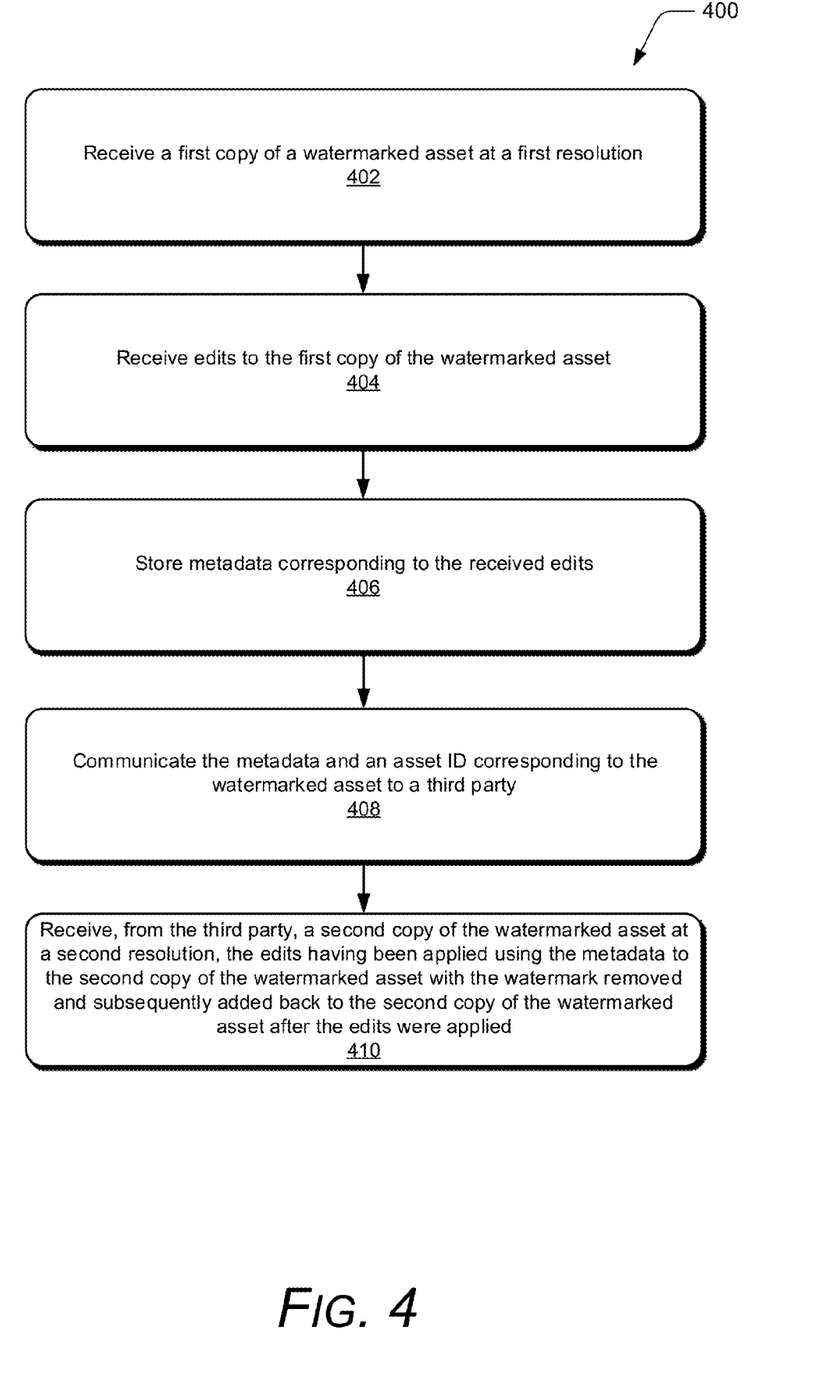
FIG. 4 is a flow diagram depicting an example procedure in accordance with one or more implementations.

FIG. 4 illustrates an example procedure 400 for editing a watermarked asset in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some embodiments the procedure may be performed in a digital medium environment by a suitably configured device, such as the example computing device 102 of FIG. 1 that makes use of an asset processing application 110, such as that described above. An asset processing application implementing procedure 400 may be, by way of example and not limitation, an independent application that has been installed on computing device 102, a service hosted by service provider 112 that is accessible by computing device 102, or a plug-in module to computing device 102.

A first copy of a watermarked asset is received at a first resolution and in a first format (block 402). For example, the watermarked asset may be received by asset retrieval component 302 in FIG. 3. The watermarked asset may comprise videos, ads, audio, multi-media streams, animations, images, web documents, web pages, applications, device applications, text documents, combinations of assets, and the like. The received copy of the watermarked asset is also stored so that is can be made available to be edited.

Edits to the first copy of the watermarked asset are received (block 404). For example, the edits may be received by editing component 304 in FIG. 3. The received edits include edits that distort a watermark in the first copy of the watermarked asset. An example of an edit that can distort the watermark is content-aware fill, where parts of an image, such as from a background of the image, are used to replace deleted portions of the image. Any suitable edit to the first copy of the watermarked asset that can distort the watermark when applied is contemplated.

The received edits are applied to the first copy of the watermarked asset and presented for consumption. For example, the received edits may be applied by editing component 304 and displayed for inspection in a GUI. A measure of error may be derived that determines an amount of distortion present in the edited watermark, compared to an undistorted watermark. The amount of measured distortion may then be visually represented in a GUI for the user to view. For example, the measure of error may be displayed as a number, an amount on a bar scale, or needle on a meter. The visual representation of the measure of error may be configured to change its appearance in the GUI based on the measure of error exceeding a predetermined value, such as by changing a color of a number displayed when the number exceeds a threshold. The measure of error may be based on a percentage of area of the watermark that is distorted, a number of predetermined critical features of the watermark that is distorted, a number of characters of the watermark that is distorted, such as the number of distorted characters being greater than a predetermined threshold number of characters, and the like.

Metadata corresponding to the received edits is stored (block 406). For example, the metadata can be stored in computer-readable storage media 106 in FIG. 1. The metadata includes edit information that can be used to apply the received edits to a copy of the watermarked asset. The metadata may include edit information corresponding to edits applied at 404 by editing component 304 in FIG. 3. For example, the metadata may include a history of edits applied to the watermarked asset that preserve the order in which the edits were applied. The history of applied edits can be accessed from the metadata, and applied to an unwatermarked asset in the same order as the edits were applied to the watermarked asset, so as to duplicate the edits made to the watermarked asset. After duplicating the edits made to the watermarked asset on an unwatermarked asset, a watermark is added to the unwatermarked asset.

The metadata also includes an asset ID corresponding to the watermarked asset that can be used to retrieve an original version of, and watermark for, the watermarked asset, such as by server 112. The metadata can be stored in any suitable manner, such as with the copy of the received watermarked asset that is stored at 402, or separately in a table, list, or report indicating a history of received edits. Furthermore, the metadata may be encoded, encrypted, or encoded and encrypted.

Metadata and an asset ID corresponding to the watermarked asset are communicated to a third party (block 408). For example, the metadata and asset ID may be communicated over network 114 to the server 112 in FIG. 1. The third party includes an asset processing application, such as asset processing application 110. Hence, using the communicated metadata and asset ID, the third party can generate an updated asset. The updated asset is generated by using the asset ID to retrieve a corresponding original version of the asset and then applying edits corresponding to edit information in the metadata to the retrieved asset. The unwatermarked original version of the asset and the watermark may be maintained in an asset store, such as asset store 720 in FIG. 7. Alternatively, the unwatermarked original version of the asset may be generated by removing a watermark from a version of the asset. Once the edits are applied to the unwatermarked original version of the asset, a watermark is added to the updated asset at the third party. This can include adding a watermark back to the asset if the watermark was removed, or adding the watermark to an unwatermarked asset that did not have the watermark previously removed. Hence, the edits corresponding to the edit information in the metadata are not applied to the watermark that is added, and therefore the watermark is not distorted in the updated asset. Rather, the updated asset contains a clean, undistorted watermark. The updated asset is used to form a second copy of the watermarked asset that is communicated over network 114 to computing device 102 in FIG. 1.

In some implementations, the metadata and asset ID are communicated responsive to receiving user input to update a watermark, such as by selecting a presented option in a GUI. The user option may be in the form of an "update watermark" button, checkbox, tab, or the like, that when selected by a user causes metadata and an asset ID to be communicated to a third party, such as service provider 112.

In other implementations, metadata and an asset ID are communicated automatically, responsive to receiving edits at block 404. Alternatively, metadata and an asset ID are communicated automatically, responsive to receiving a predetermined number of edits, or receiving a type of edit, such as a content-aware fill. Alternatively, metadata and an asset ID are communicated automatically, responsive to determining that a certain portion of the watermark has been edited, such as a company logo, that the watermark is determined to be too distorted, such as beyond a threshold amount of error in the edited watermark compared to an original, undistorted watermark, or based on a percentage of the watermark being distorted. Alternatively, metadata and an asset ID are communicated automatically every N edits received at 404, for some integer N.

A second copy of the watermarked asset at a second resolution and in a second format is received from the third party (block 410). For example, asset retrieval component 302 may receive a second copy of the watermarked asset from service provider 112 over network 114 in FIG. 3. The second copy of the watermarked asset has had the edits applied to it with the watermark removed and subsequently added back to the second copy of the watermarked asset after the edits were applied, as described above. The copy of the updated watermarked asset that is received from the third party can be at a second resolution, as described above.

In some implementations, the first resolution is the same as the second resolution. In other implementations, the first resolution is lower than the second resolution. Thus, a user may edit a watermarked asset at a low resolution, and be provided a high resolution version of the watermarked asset once edits have been applied. In yet other implementations, the second resolution is lower than the first resolution.

In some implementations, the first copy of the watermarked asset is not licensed or purchased, thus allowing the user to edit the watermarked asset before licensing or purchasing the watermarked asset. In some implementations, the second copy of the watermarked asset may be licensed or purchased. For example, a user may receive the second copy of the watermarked asset and upon inspection, the user may select an option in a GUI to purchase or license the watermarked asset. Upon selecting the option to purchase or license the asset, the user is provided a copy of the updated asset containing the user's edits, but with the watermark removed. Thus, the user need not re-apply the edits upon purchase or license. Furthermore, the resolution of the copy of the updated asset containing the user's edits, but with the watermark removed, may be the same, lower, or higher than the first resolution or the second resolution. For example, the resolution or format of the copy of the updated asset containing the user's edits, but with the watermark removed, may depend on terms of a purchasing or licensing agreement, such as price, number of allowed uses of the asset, length of time the asset can be used, and the like.

Figure 5:
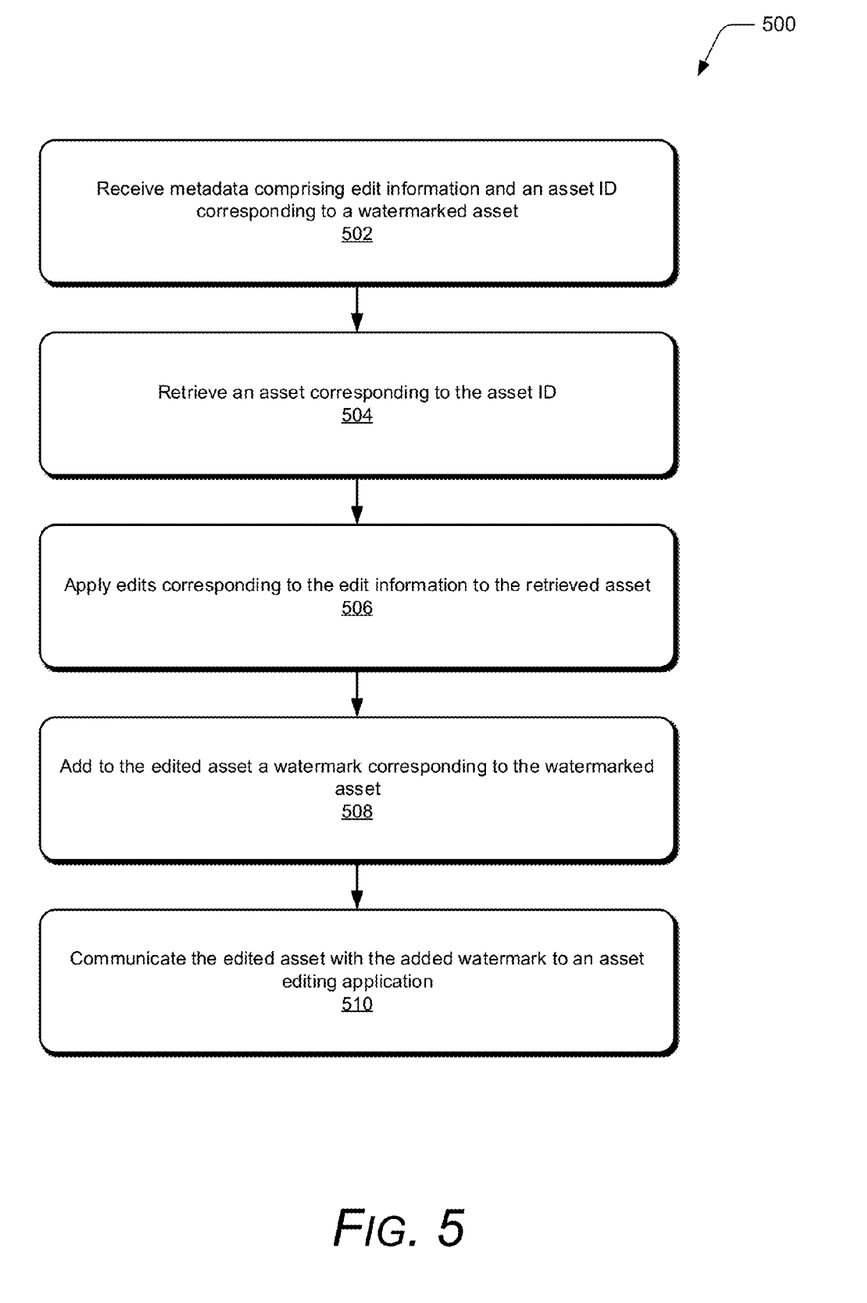
FIG. 5 is a flow diagram depicting an example procedure in accordance with one or more implementations.

FIG. 5 illustrates an example procedure 500 for editing a watermarked asset in accordance with one or more embodiments. Aspects of the procedure may be implemented in hardware, firmware, or software, or a combination thereof.

The procedure is shown as a set of blocks that specify operations performed by one or more devices and are not necessarily limited to the orders shown for performing the operations by the respective blocks. In at least some embodiments the procedure may be performed in a digital medium environment by a suitably configured device, such as service provider 112 of FIG. 1 that makes use of an asset processing application, such as asset processing application 110, as described above. In other embodiments the procedure may be performed in a digital medium environment by a suitably configured device, such as computing device 102 of FIG. 1 that makes use of asset processing application 110, as described above.

Metadata comprising edit information and an asset ID corresponding to a watermarked asset is received (block 502). For example, the metadata and asset ID may be provided from computing device 102 and received by service provider 112 in FIG. 1. The edit information represents edits made to a first copy of the watermarked asset, and includes at least one edit that distorts a watermark or otherwise adversely affects an appearance of a watermark. An example of a distorted watermark is provided above. The received metadata and asset ID may be decoded, decrypted, or decoded and decrypted, as appropriate.

An asset that does not include a watermark is retrieved using the asset ID (block 504). For example, service provider 112 may use the received asset ID to retrieve an asset from an asset store, such as asset store 720 in FIG. 7. In some implementations, a watermark is retrieved separately from the retrieved asset using the asset ID, such as by using a first look up with the asset ID to locate the asset and a second look up with the asset ID to locate the watermark. In other implementations, watermarks are stored together with assets, and the retrieved asset and watermark are retrieved together with the asset ID, such as by using a single look up with the asset ID to locate both the asset and the watermark. In some implementations, the retrieved asset that does not include a watermark is generated by retrieving an asset with a watermark and removing the watermark from the asset.

Edits corresponding to the edit information are applied to the retrieved asset without the watermark (block 506). For example, the edits may be applied at service provider 112 using an asset processing application, like asset processing application 110. Since the retrieved asset to which the edits are applied does not contain a watermark, edits corresponding to the edit information are not applied to the watermark.

A watermark is then added to the edited asset (block 508). The added watermark may be retrieved at block 504 and added to the edited asset generated at block 506. By virtue of being added after the edits are applied to the asset, the added watermark does not contain edits corresponding to the edit information and thus, constitutes a clean, undistorted watermark.

The edited asset with the added watermark, i.e., the updated watermarked asset, is communicated to an asset editing application (block 510). For example, the edited asset with the added watermark may be communicated over network 114 to asset processing application 110 in FIG. 3. In some implementations, the updated asset is resampled, reformatted, or resampled and reformatted before being communicated to the asset editing application. For example, the updated asset may be down-sampled before being communicated to the asset editing application.

Figure 6:
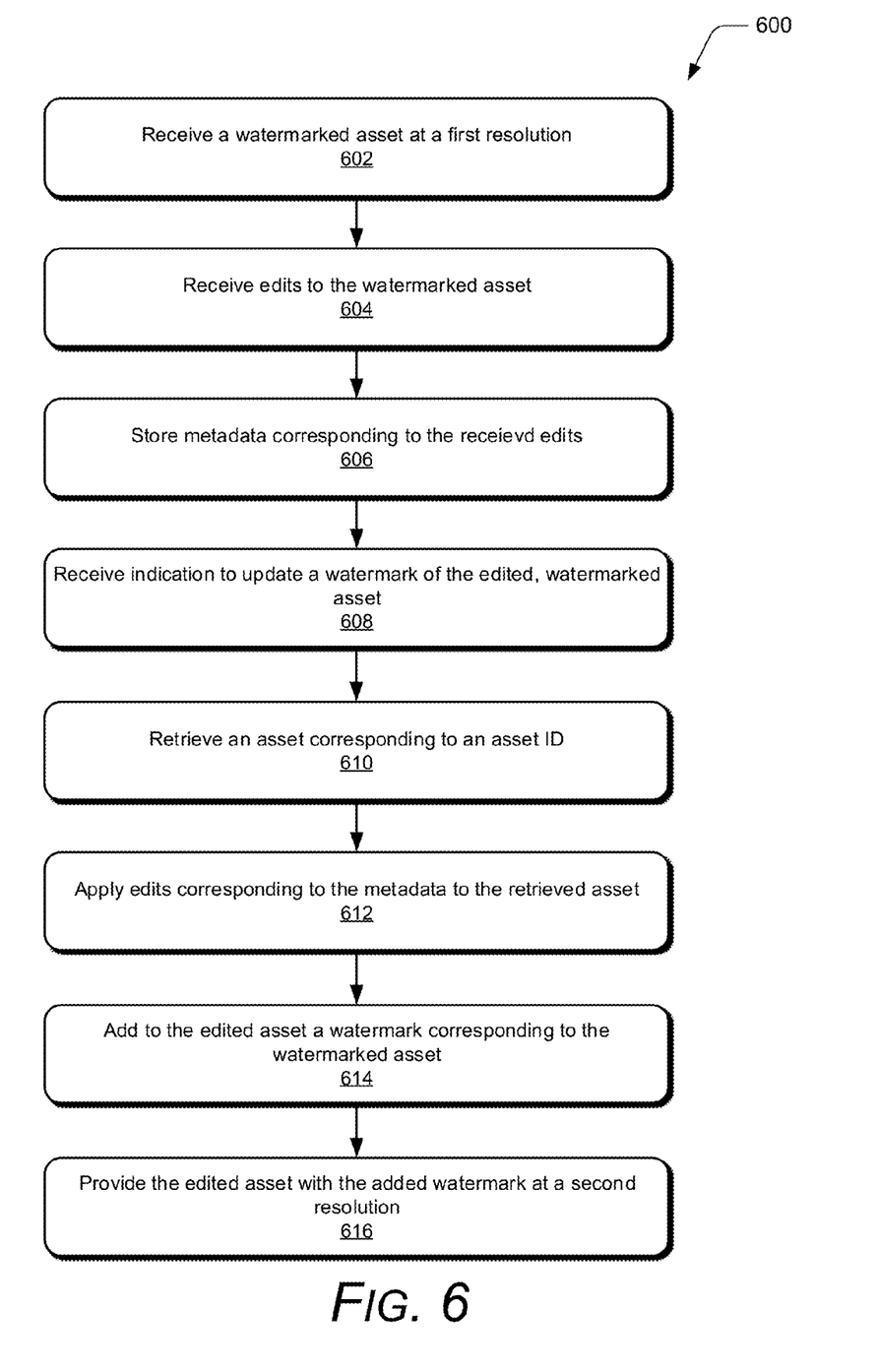
FIG. 6 is a flow diagram depicting an example procedure in accordance with one or more implementations.

FIG. 6 illustrates an example procedure 600 for editing a watermarked asset in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some embodiments, the procedure may be performed in a digital medium environment by a suitably configured device, such as the example computing device 102 of FIG. 1 that makes use of asset processing application 110, as described above.

A watermarked asset at a first resolution is received (block 602). For example, image 202 in FIG. 2 illustrates a watermarked asset that may be received by asset processing application 110 in FIG. 3. The received watermarked asset is also stored so that it can be made available to be edited.

Edits to the watermarked asset are received (block 604). The edits, when applied to the watermarked asset, may cause the watermark to be distorted, such as watermark 210 in watermarked image 204 in FIG. 2. The received edits may be applied and displayed in a GUI. A measure of error may be derived that determines an amount of distortion present in the edited watermark, compared to an undistorted watermark. Examples of how this can be done are provided above.

Metadata corresponding to the received edits is stored (block 606). For example, the metadata can be stored in computer-readable storage media 106 in FIG. 1. The metadata includes edit information that can be used to apply the received edits to the watermarked asset. The metadata also includes an asset ID corresponding to the watermarked asset that can be used to retrieve an original version of, and watermark for, the watermarked asset. The metadata can be stored in any suitable manner, and may be encoded, encrypted, or encoded and encrypted.

An indication to update a watermark of the edited, watermarked asset is received (block 608). In some implementations, the indication is received responsive to user input to update a watermark, such as by selecting a presented option in a GUI. The user option may be in the form of an "update watermark" button, checkbox, tab, or the like that, when selected by a user, causes the indication to update the watermark to be received. In other implementations, the indication is received responsive to receiving the edits. Alternatively, the indication is received responsive to receiving a predetermined number of edits, or receiving a type of edit, such as a content-aware fill. Alternatively, the indication is received automatically responsive to determining that a certain portion of the watermark has been edited, such as a company logo, that the watermark is determined to be too distorted, such as beyond a threshold amount of error in the edited watermark compared to an original, undistorted watermark, or based on a percentage of the watermark being distorted. Alternatively, the indication is received automatically every N edits received at 604, for some integer N.

Operations 610, 612, 614, and 616 are then performed responsive to receiving the indication at block 608.

Specifically, at block 610, an asset corresponding to the asset ID and not including a watermark is retrieved. In some implementations, a watermark is retrieved separately from the retrieved asset using the asset ID, such as by using a first look up with the asset ID to locate the asset and a second look up with the asset ID to locate the watermark. In other implementations, watermarks are stored together with assets, and the retrieved asset and watermark are retrieved together with the asset ID, such as by using a single look up with the asset ID to locate both the asset and the watermark. In some implementations, the retrieved asset that does not include a watermark is generated by retrieving an asset with a watermark and removing the watermark from the asset.

Edits corresponding to the metadata are applied to the retrieved asset that does not include a watermark (block 612). For example, the edits may be applied using asset processing application 110 in computing device 102 in FIG. 1. Since the retrieved asset to which the edits are applied does not contain a watermark, edits are not applied to the watermark.

A watermark corresponding to the watermarked asset is then added to the edited asset (block 614). The added watermark does not contain the edits applied at block 612 and, as such constitutes a clean, undistorted watermark. Adding a watermark after applying edits to the asset generates an updated watermarked asset.

The edited asset with the added watermark is provided at a second resolution (block 616). For example, the edited asset with the added watermark may be provided in a GUI comprising of the computing device 102. Examples of how this can be done are provided above.

Having considered example procedures in accordance with one or more implementations, consider now an example system and device that can be utilized to practice the inventive principles described herein.

Example System and Device

Figure 7:
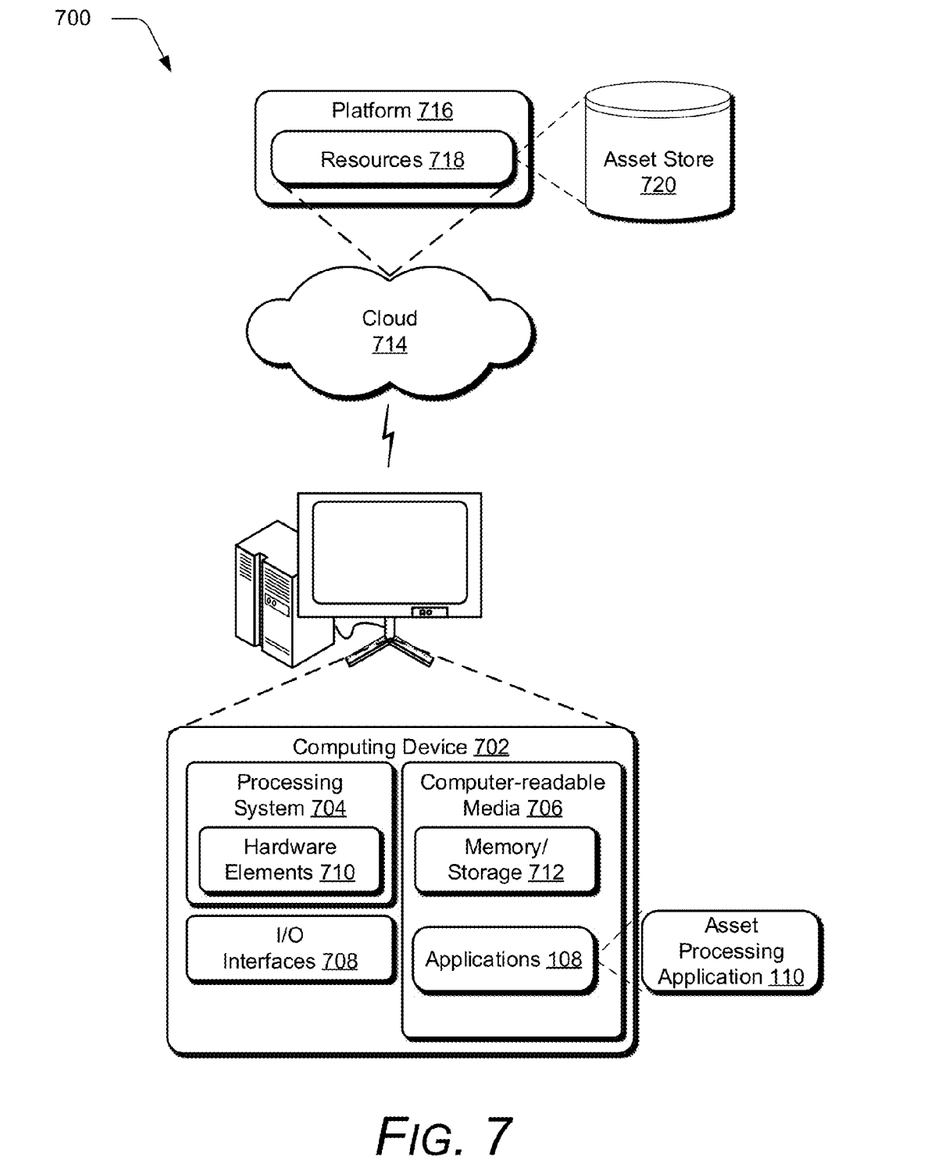
FIG. 7 illustrates an example system including various components of an example device that can be employed for one or more implementations described herein.

FIG. 7 illustrates an example system generally at 700 that includes an example computing device 702 that is representative of one or more computing systems and devices that may implement the various techniques described herein. This is illustrated through inclusion of the applications 108 and, in particular, asset processing application 110, which operates as described above. The computing device 702 may be, for example, a server of a service provider, a device associated with a client (e.g., a client device), an on-chip system, or any other suitable computing device or computing system.

The example computing device 702 includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)), nonvolatile media (such as read only memory (ROM), Flash memory, optical disks, magnetic disks, and so forth), or combinations thereof. The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic, fixed device logic implemented in a hardware form, or combinations thereof that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 710, or combinations thereof. The computing device 702 may be configured to implement particular instructions and functions corresponding to the software and hardware modules. Accordingly, implementation of a module that is executable by the computing device 702 as software may be achieved at least partially in hardware, e.g., through use of computer-readable storage media and hardware elements 710 of the processing system 704. The instructions and functions may be executable/operable by one or more articles of manufacture (for example, one or more computing devices 702 or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and is representative of a platform 716 for resources 718. The platform 716 abstracts underlying functionality of hardware (e.g., servers) and software resources of the cloud 714. The resources 718 may include applications, data, or applications and data that can be utilized while computer processing is executed on servers that are remote from the computing device 702. Resources 718 can also include services provided over the Internet, through a subscriber network, such as a cellular or Wi-Fi network, or combinations thereof. Resources 718 can include asset store 117, which stores original assets, watermarked assets, and watermarks, and may be accessed using an asset ID.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

In one or more implementations, a digital medium environment includes an asset processing application that performs editing on a watermarked asset. An improved editing method implemented by the asset processing application comprises receiving a watermarked asset, receiving edits to the watermarked asset, storing metadata corresponding to the edits together with an asset identification (ID), communicating the metadata and asset ID, applying edits using the metadata to an unwatermarked version of the asset retrieved using the asset ID, adding a watermark back to the edited asset, and providing the edited, watermarked asset.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by an asset processing application that performs editing of a watermarked asset in a digital medium environment, the method comprising:
   receiving a first copy of a watermarked asset that includes a watermark;
   receiving edits to the first copy of the watermarked asset, wherein the edits are applied to the first copy of the watermarked asset and distort the watermark;
   storing metadata corresponding to the received edits;
   communicating the metadata and an asset ID corresponding to the watermarked asset to a third party; and
   receiving, from the third party, a second copy of the watermarked asset, the edits having been applied using the metadata to the second copy of the watermarked asset, the second copy of the watermarked asset including an undistorted version of the watermark that was previously distorted.

2. The method as described in claim 1, wherein the watermarked asset comprises an image.

3. The method as described in claim 1, wherein the first copy of the watermarked asset is at a lower resolution than the second copy of the watermarked asset.

4. The method as described in claim 1, wherein the communicating is performed automatically in response to the receiving the edits to the first copy of the watermarked asset.

5. The method as described in claim 1, wherein the communicating is performed in response to receiving user input to update the watermark.

6. The method as described in claim 1, wherein the undistorted version of the watermark has no edits applied to it corresponding to the metadata.

7. A computer-readable storage media in a digital medium environment in which a computing device can use an asset processing application to perform processing of a watermarked asset, the computer-readable storage media comprising instructions stored thereon that, responsive to execution by the computing device, perform operations comprising:

receiving, from an asset editing application, metadata comprising edit information associated with a first watermarked asset and an asset ID corresponding to the first watermarked asset, wherein edits corresponding to the edit information applied to the first watermarked asset distort a watermark in the first watermarked asset;

retrieving an asset corresponding to the asset ID;

applying edits corresponding to the edit information to the retrieved asset, the retrieved asset not including the watermark when the edits are applied;

adding to the asset to which the edits were applied an undistorted version of the watermark that was previously distorted to provide a second watermarked asset; and     providing the second watermarked asset to the asset editing application.

8. The computer-readable storage media as described in claim 7, wherein the first watermarked asset is at a lower resolution than the second watermarked asset.

9. The computer-readable storage media as described in claim 7, wherein the first watermarked asset comprises an image.

10. The computer-readable storage media as described in claim 7, wherein the undistorted version of the watermark is not edited according to the edit information.

11. The computer-readable storage media as described in claim 7, wherein the first watermarked asset is not licensed by a user of the asset editing application.

12. The computer-readable storage media as described in claim 7, wherein the edited asset with the undistorted version of the watermark is licensed by a user of the asset editing application.

13. A system implemented in a digital medium environment including a computing device having an asset processing application to perform processing of a watermarked asset, the system comprising:

a processor; and at least one computer-readable memory storing instructions executable via the processor to implement the asset processing application configured to perform operations comprising:

receiving, from an asset editing application, metadata comprising edit information associated with a first watermarked asset and an asset ID corresponding to the first watermarked asset;

retrieving an asset corresponding to the asset ID;

applying edits corresponding to the edit information to the retrieved asset that does not include a watermark;

adding to the asset to which the edits were applied a watermark corresponding to the watermarked asset to provide a second watermarked asset;

providing the second watermarked asset to the asset editing application;

receiving, from the asset editing application, a user license agreement for the watermarked asset; and         providing to the asset editing application, responsive to the receiving the user license agreement, an additional asset not including the watermark corresponding to the watermarked asset and with the edits corresponding to the edit information applied to the additional asset.

14. The method as described in claim 7, wherein the first watermarked asset is at a lower resolution than the second watermarked asset.

15. The system as described in claim 13, wherein the first watermarked asset comprises an image.

16. The system as described in claim 13, wherein the edit information comprises edits of a watermark in the first watermarked asset.

17. The system as described in claim 13, wherein the retrieving an asset further comprises retrieving the watermark to be added to the asset to which the edits were applied.

18. The system as described in claim 13, wherein the operations further comprise down-sampling the second watermarked asset prior to said providing the second watermarked asset.

19. The computer-readable storage media as described in claim 7, wherein the first watermarked asset is at a higher resolution than the second watermarked asset.

20. The computer-readable storage media as described in claim 7, wherein the receiving comprises receiving the edit information and the asset ID separate from the first watermarked asset.

* * * * *